(12) United States Patent
Vickers et al.

(10) Patent No.: US 8,152,182 B2
(45) Date of Patent: Apr. 10, 2012

(54) PUSHCHAIR

(75) Inventors: Robert Ian Vickers, Nr. Southwell (GB); Samuel Blackburn Pearce, Nr. Southwell (GB)

(73) Assignee: Space Net Technology Limited (GB)

( * ) Notice: Subject to any disclaimer, the term of this patent is extended or adjusted under 35 U.S.C. 154(b) by 411 days.

(21) Appl. No.: 11/921,719

(22) PCT Filed: Jun. 5, 2006

(86) PCT No.: PCT/GB2006/002054
§ 371 (c)(1),
(2), (4) Date: Jan. 5, 2009

(87) PCT Pub. No.: WO2006/131715
PCT Pub. Date: Dec. 14, 2006

(65) Prior Publication Data
US 2009/0267314 A1  Oct. 29, 2009

(30) Foreign Application Priority Data

Jun. 4, 2005  (GB) .................................. 0511393.1
Mar. 24, 2006  (GB) .................................. 0605917.4

(51) Int. Cl.
*B62B 7/04* (2006.01)
(52) U.S. Cl. .................................... 280/47.38; 280/47.4
(58) Field of Classification Search .................. 280/644, 280/642, 647, 649, 650, 47.38, 47.4; 297/452.56
See application file for complete search history.

(56) References Cited

U.S. PATENT DOCUMENTS

| 3,230,011 | A | * | 1/1966 | Propst | 297/440.11 |
| 3,606,453 | A | | 9/1971 | Cicero | 297/254 |
| 4,062,590 | A | * | 12/1977 | Polsky et al. | 297/452.56 |
| 4,364,607 | A | | 12/1982 | Tamburini | 297/452 |
| 4,552,406 | A | | 11/1985 | Ohl | 297/445 |
| 4,602,816 | A | | 7/1986 | Chandler | 296/63 |
| 4,662,038 | A | | 5/1987 | Walker | 24/460 |
| 5,013,089 | A | * | 5/1991 | Abu-Isa et al. | 297/452.64 |
| 5,183,311 | A | | 2/1993 | Meeker et al. | 297/151 |
| 5,342,111 | A | | 8/1994 | Charles | 297/232 |
| 5,393,126 | A | * | 2/1995 | Boulva | 297/452.56 |
| 5,445,254 | A | | 8/1995 | Charles | 192/17 R |

(Continued)

FOREIGN PATENT DOCUMENTS

CN  2294195  10/1998

(Continued)

OTHER PUBLICATIONS

English translation of Official Action dated Sep. 18, 2009 for Chinese Patent Application No. 2006800277925, 4 pages.

(Continued)

*Primary Examiner* — Jeffrey J Restifo
(74) *Attorney, Agent, or Firm* — Nikolai & Mersereau, P.A.; Thomas J. Nikolai

(57) ABSTRACT

A pushchair for restraining, supporting and transporting a child comprises a ground-engaging frame to support a seat for a child. The frame includes a plurality of ground-engaging wheels to facilitate movement of the frame and one or more handles to allow a carer to control movement of the frame. The seat includes first and second seating components mounted on the frame to define a seat base and a seat back. Each seating component includes a closed frame over which a flexible membrane is stretched to define a support surface.

10 Claims, 2 Drawing Sheets

U.S. PATENT DOCUMENTS

| | | | | |
|---|---|---|---|---|
| 5,582,463 | A * | 12/1996 | Linder et al. | 297/452.2 |
| 5,775,772 | A | 7/1998 | Lefranc | 297/250.1 |
| 5,915,787 | A | 6/1999 | Brookman | 297/256.13 |
| 5,964,502 | A | 10/1999 | Stephens | 297/250.1 |
| 6,254,190 | B1 * | 7/2001 | Gregory | 297/452.1 |
| 6,378,944 | B1 | 4/2002 | Weisser | 297/440.11 |
| 6,439,665 | B1 * | 8/2002 | Cvek | 297/440.11 |
| 6,568,755 | B1 | 5/2003 | Groening | 297/256.13 |
| 6,623,074 | B2 | 9/2003 | Asbach et al. | 297/250.1 |
| 6,623,079 | B2 | 9/2003 | Gregory | 297/440.11 |
| 6,908,151 | B2 | 6/2005 | Meeker et al. | 297/250.1 |
| 6,942,300 | B2 * | 9/2005 | Numa et al. | 297/452.56 |
| 7,152,929 | B2 * | 12/2006 | Wu | 297/452.56 |
| 7,278,683 | B2 | 10/2007 | Williams et al. | 297/250.1 |
| 7,425,039 | B2 * | 9/2008 | Lin | 297/452.56 |
| 7,434,888 | B2 * | 10/2008 | Lin | 297/452.56 |
| 7,647,714 | B2 * | 1/2010 | Coffield et al. | 38/102 |
| 7,731,295 | B2 * | 6/2010 | Lin | 297/452.56 |
| 2003/0151219 | A1 | 8/2003 | Simard | 280/47.35 |
| 2004/0231129 | A1 | 11/2004 | VanDeRiet et al. | 29/448 |
| 2005/0127735 | A1 | 6/2005 | Munsch | 297/391 |
| 2005/0264087 | A1 * | 12/2005 | Diffrient | 297/452.64 |
| 2006/0138849 | A1 * | 6/2006 | Wilkerson et al. | 297/452.56 |
| 2008/0315661 | A1 * | 12/2008 | Lin | 297/452.56 |
| 2009/0267314 | A1 * | 10/2009 | Vickers et al. | 280/47.38 |
| 2010/0244523 | A1 * | 9/2010 | Ho | 297/338 |

FOREIGN PATENT DOCUMENTS

| | | |
|---|---|---|
| CN | 1349909 A | 5/2002 |
| DE | 4140638 | 6/1993 |
| DE | 19527351 | 1/1997 |
| DE | 29708736 U | 7/1997 |
| DE | 20203348 U | 8/2002 |
| DE | 20308464 | 8/2003 |
| EP | 0751033 | 1/1997 |
| EP | 0931691 | 7/1999 |
| EP | 1122120 | 8/2001 |
| EP | 1295582 | 3/2003 |
| EP | 1336531 | 8/2003 |
| GB | 623055 | 5/1949 |
| GB | 2099376 | 12/1982 |
| GB | 2186907 | 8/1987 |
| GB | 2216402 | 10/1989 |
| GB | 2361865 | 11/2001 |
| JP | 9039627 | 2/1997 |
| JP | 2001105942 | 4/2001 |
| JP | 2002087121 | 3/2002 |
| JP | 2002211298 | 7/2002 |
| JP | 2002253391 | 9/2002 |
| JP | 200372435 | 3/2003 |
| WO | WO9819579 | 5/1998 |
| WO | WO9819879 | 5/1998 |
| WO | WO04000602 | 12/2003 |
| WO | WO2005053998 | 6/2005 |

OTHER PUBLICATIONS

Official Action dated Sep. 18, 2009 for Chinese Patent Application No. 2006800277925, 4 pages.

English translation of Official Action dated Apr. 2. 2010 for Chinese Patent Application No. 2006800277925, 4 pages.

Official Action dated Apr. 2, 2010 for Chinese Patent Application No. 2006800277925, 4 pages.

British Search Report for Application No. GB0605917.4, Jun. 9, 2006, 2 pages.

British Search Report for Application No. GB0511393.1, Jul. 28, 2005, 5 pages.

English translation of Official Action dated Apr. 3, 2009 for Chinese Patent Application No. 2006800277925, 7 pages.

Official Action dated Apr. 3, 2009 for Chinese Patent Application No. 2006800277925, 36 pages.

English translation of Official Action dated Apr. 3, 2009 for Chinese Patent Application No. 2006800279634, 7 pages.

Official Action dated Apr. 3, 2009 for Chinese Patent Application No. 2006800279634, 44 pages.

PCT International Search Report, European Patent Office, Date of Actual Completion of the International Search Aug. 16, 2006, includes Notification of Transmittal, 7 pages.

* cited by examiner

PUSHCHAIR

CROSS REFERENCE TO RELATED APPLICATION

This application is related to co-pending U.S. application Ser. No. 11/921,720, filed Mar. 5, 2009, and entitled "CHILD VEHICLE SEATING SYSTEM".

FIELD OF THE INVENTION

The present invention relates to a pushchair for restraining, supporting and transporting a child.

DISCUSSION OF THE PRIOR ART

Pushchairs for transporting children generally include a ground-engaging frame including ground-engaging wheels to facilitate movement of the frame and one or more handles for a carer to hold during use and thereby control movement of the frame.

A seat is mounted on the frame to support and restrain a child, and can vary greatly in terms of the size, shape and overall configuration. For example, seats may be constructed simply from fabric components suspended within the frame of the pushchair. While such seats render the pushchair relatively light and easy to manoeuvre, they often lack rigidity and provide minimal support and protection for a child during use.

While the support and protection provided by the seat may be improved by forming the seat as a rigid component, such seats are generally moulded from a plastics material. This increases the overall weight and bulkiness of the pushchair, which in turn can lead to manoeuvrability problems. In addition, the use of such materials means that such seats are often poorly ventilated.

SUMMARY OF THE INVENTION

According to an aspect of the invention there is provided a pushchair for restraining, supporting and transporting a child comprising a ground-engaging frame to support a seat for a child, the frame including a plurality of ground-engaging wheels to facilitate movement of the frame and one or more handles to allow a carer to control movement of the frame, and the seat including first and second seating components mounted on the frame to define a seat base and a seat back, each seating component including a closed frame over which a flexible membrane is stretched to define a support surface.

The provision of seating components including a support surface defined by a flexible membrane stretched over a closed frame means that a solid support member is not required. This enables the provision of a pushchair that is relatively light, rendering the pushchair relatively easy to manoeuvre.

The seating components may be provided as two separate components, each having a separate closed frame and a separate flexible membrane provided to define a support surface. However, in other embodiments, the closed frames of the seating components may be formed integrally. In such embodiments a single flexible membrane may be stretched over the integral frame structure to define a support surface or, alternatively, two or more flexible membranes may be stretched over the integral frame structure in sections to define a support surface.

Each of the closed frames is preferably shaped such that the flexible membrane stretched over the frame forms a contoured support surface. This enables the seating components to be shaped in order to curve around a child when the child is seated in the pushchair to define an ergonomic support and thereby improve the support provided by the seating components.

It also enables the seating components to be shaped to minimize the amount of contact between a child supported in the pushchair and solid components. Consequently, the overall comfort of the pushchair can be improved.

Preferably the flexible membrane stretched over each seating component is tensioned to assist in producing an ergonomic support for a child.

References herein to a closed frame are intended to refer to a continuous frame bounding a hollow interior, which may include two or more opposed frame elements connected end to end to form a closed frame.

Preferably the flexible membrane is formed from a porous, breathable fabric. This ensures that the seat is ventilated and thereby benefits a child supported in the seat in that it assists in reducing the risk of the child overheating in high ambient temperatures.

In a particularly, preferred embodiment, the porous, breathable, fabric is a mesh fabric that allows a user to see through the seating components. This can be particularly advantageous in circumstances where a carer needs to lift and carry the pushchair in front of them, for example, up a flight of steps.

DESCRIPTION OF THE DRAWINGS

An embodiment of the invention will now be described, by way of a non-limiting example, with reference to the accompanying drawings in which.

DESCRIPTION OF THE PREFERRED EMBODIMENT

Figure 1:
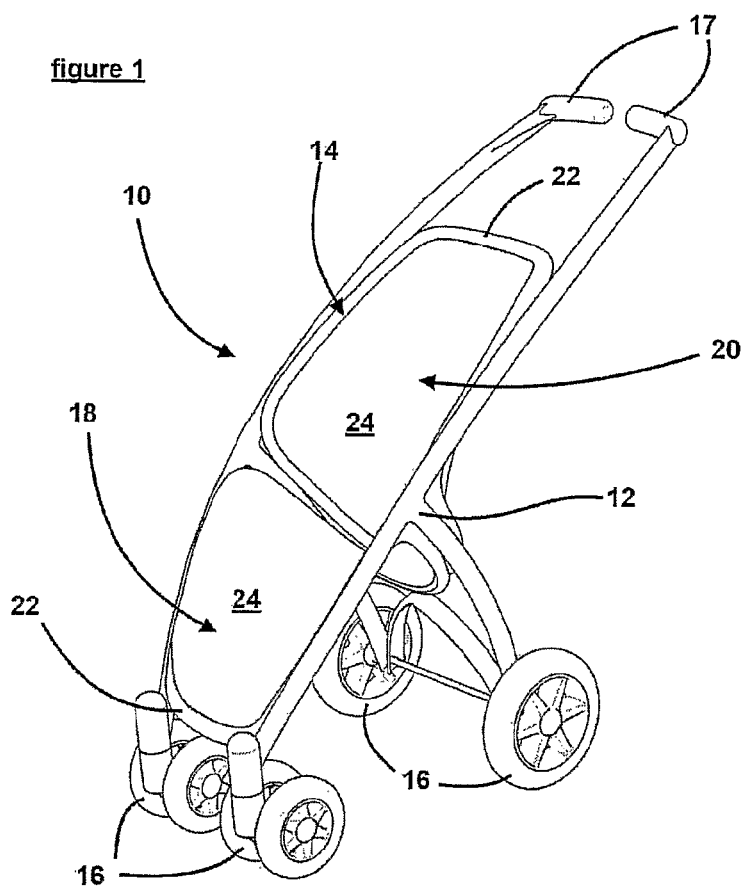
FIG. 1 shows a pushchair according to an embodiment of the invention.
Figure 2:
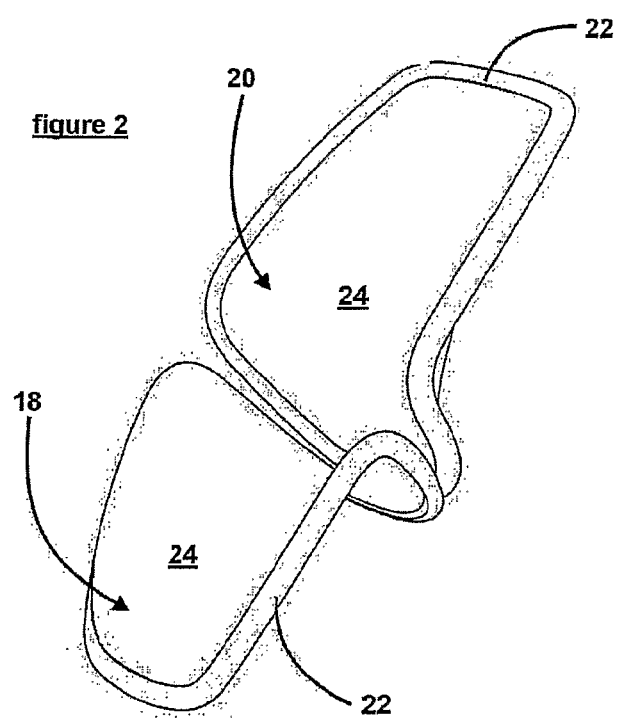
FIG. 2 shows first and second seating components of the pushchair of FIG. 1.

A pushchair 10 according to an embodiment of the invention is shown in FIG. 1 and includes a ground-engaging frame 12, which supports a seat 14. Ground-engaging wheels 16 are provided on the frame 12 to facilitate movement of the frame 12, and the seat 14 includes first and second seating components 18,20 mounted on the frame 12 to define a seat base and a seat back respectively. In the embodiment shown in FIG. 1, the frame 12 is constructed to provide a pair of spaced handles 17 extending above the second seating component 20 of the seat 14 for a carer to hold in order to control movement of the frame 12. In other embodiments it is envisaged that an elongate handle member may be provided to extend across the top of the second seating component 20.

Figure 3:
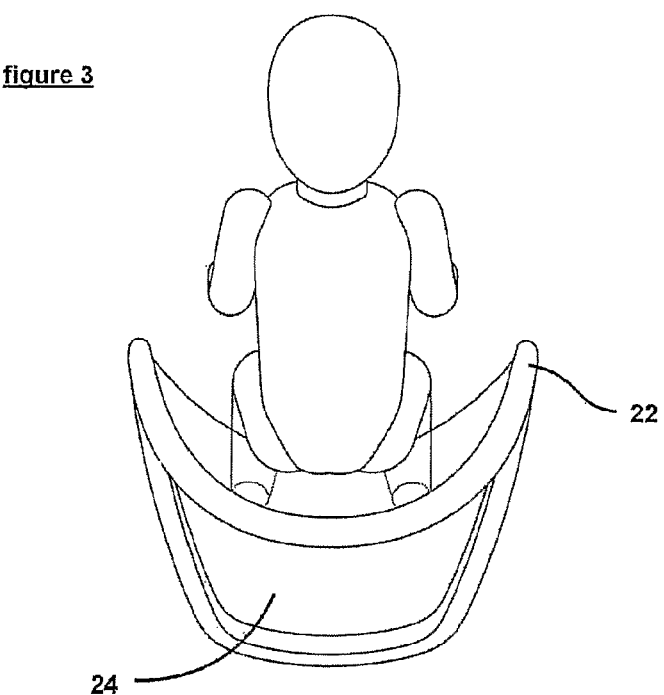
FIG. 3 shows the first seating component of the pushchair of FIG. 1.
Figure 4:
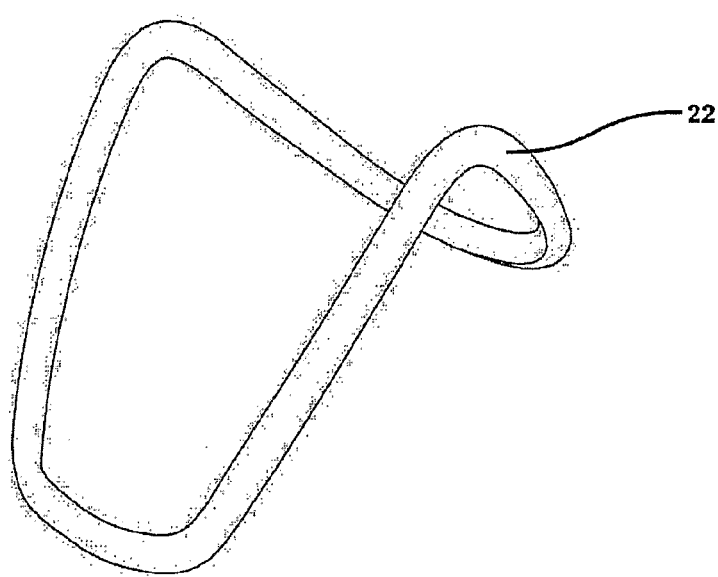
FIG. 4 shows a closed frame of the first seating component of FIG. 3.

Each seating component 18,20 includes a closed frame 22 over which a flexible membrane 24 is stretched to define a support surface. The closed frame 22 of each of the seating components 18,20 is preferably shaped such that the flexible membrane 24 stretched over, the frame 22 forms a contoured support surface. In the embodiment shown in FIG. 1, the closed frames 22 of the seating components 18,20 are shaped to curve around a child seated in the seat 14 such that the flexible membrane 24 stretched thereover supports the child and resists sideways movement of the child relative to the seating components 18,20. This is exemplified in FIGS. 3 and 4, which show the first seating component 18 forming the seat base of the seat 14 (FIG. 3) and the corresponding frame 22 (FIG. 4).

Preferably the flexible membrane 24 stretched over each seating component 18,20 is tensioned to assist in producing an ergonomic support for a child.

In the embodiment shown in FIG. 1, the closed frames 22 of the seating components 18,20 are also shaped so that the support provided by each of the seating components 18,20 is provided entirely by the contoured support surface defined by the flexible membrane 24. This arrangement minimizes the amount of contact between a child seated in the pushchair 10 and solid components, for example, the frames 22. It therefore minimizes the risk of discomfort that may otherwise result from contact between a child seated in the pushchair 10 and solid components in the pushchair 10. The flexible membrane 24 stretched over the frame 22 of each of the seating components 18,20 is preferably a porous, breathable, fabric to ventilate the seating components 18,20 and thereby minimize the risk of a child seated in the pushchair 10 from overheating in high ambient temperatures.

In the embodiment shown in FIG. 1, the flexible membrane 24 is a porous, breathable, fabric in the form a mesh fabric.

The use of flexible membranes 24 in the form of a mesh fabric is advantageous in circumstances where a carer needs to lift and carry the pushchair 10 in front of them, for example, up a flight of steps, since it allows the carer to see through, the seating components 18,20 and thereby avoid the risk of colliding with other objects, for example.

The seating components 18,20 of the embodiment shown in FIG. 1 are formed as two separate components, each having a separate closed frame 22 and a separate flexible membrane 24 to define a support surface. However, in other embodiments, the closed frames 22 of the seating components 18,20 may be formed integrally to define an integral seating frame structure. In such embodiments, a single flexible membrane may be stretched over the entire frame structure to define a support surface and complete the first and second seating components. Alternatively two or more flexible membranes may be stretched in sections over the frame structure to define the support surface.

The invention claimed is:

1. A pushchair for restraining, supporting and transporting a child comprising:
   a ground engaging frame to support a seat for the child,
   the frame including a plurality of ground engaging wheels to facilitate movement of the frame,
   one or more handles to allow a care person to control movement of the frame,
   the seat including first and second seating components mounted on the frame to define a seat base and a seat back,
   each of the seating components including a frame structure forming a closed loop where a first portion of the loop is bent generally perpendicular to a remaining portion of the loop and over which a flexible membrane is stretched to define a support surface,
   the first and second one-piece frame structures being positioned with respect to one another such that the flexible membrane stretched over the frame structure forms a concave, contoured support surface that is adapted to curve about the legs and torso of a child when seated thereon to cradle the child while minimizing contact between the child and the solid components of the frame structure.

2. The pushchair according to claim 1 wherein the one or more handles extend upward beyond an upper end of the seat back.

3. The pushchair according to claim 1 wherein the seating components each having a separate flexible membrane stretched thereover to define the support surface.

4. The pushchair according to claim 1 wherein the closed frame structures of the seating components are integrally joined to one another and the flexible membrane is stretched over the integral frame structures to define the support surface.

5. The pushchair according to claim 4 wherein each of the closed frame structures is shaped such that the flexible membrane when stretched over the frame structures forms a contoured support surface.

6. The pushchair according to claim 4 wherein the flexible membrane stretched over the closed frame structures of each seating component is tensioned to assist in producing an ergonomic support for the child.

7. The pushchair according to claim 4 wherein the flexible membrane is formed from a porous, breathable fabric.

8. The pushchair according to claim 7 wherein the porous, breathable, fabric is a mesh fabric.

9. The pushchair according to claim 1 wherein the closed frames of the seating components are integrally joined to one another and two or more flexible membranes are stretched over the integrally joined frame structures to define the support surface.

10. A pushchair according to claim 1, further including a second flexible membrane stretched over the second seating component to define a second support surface and the first seating component has the flexible membrane stretched thereover to define the support surface.

* * * * *